Figure 1:
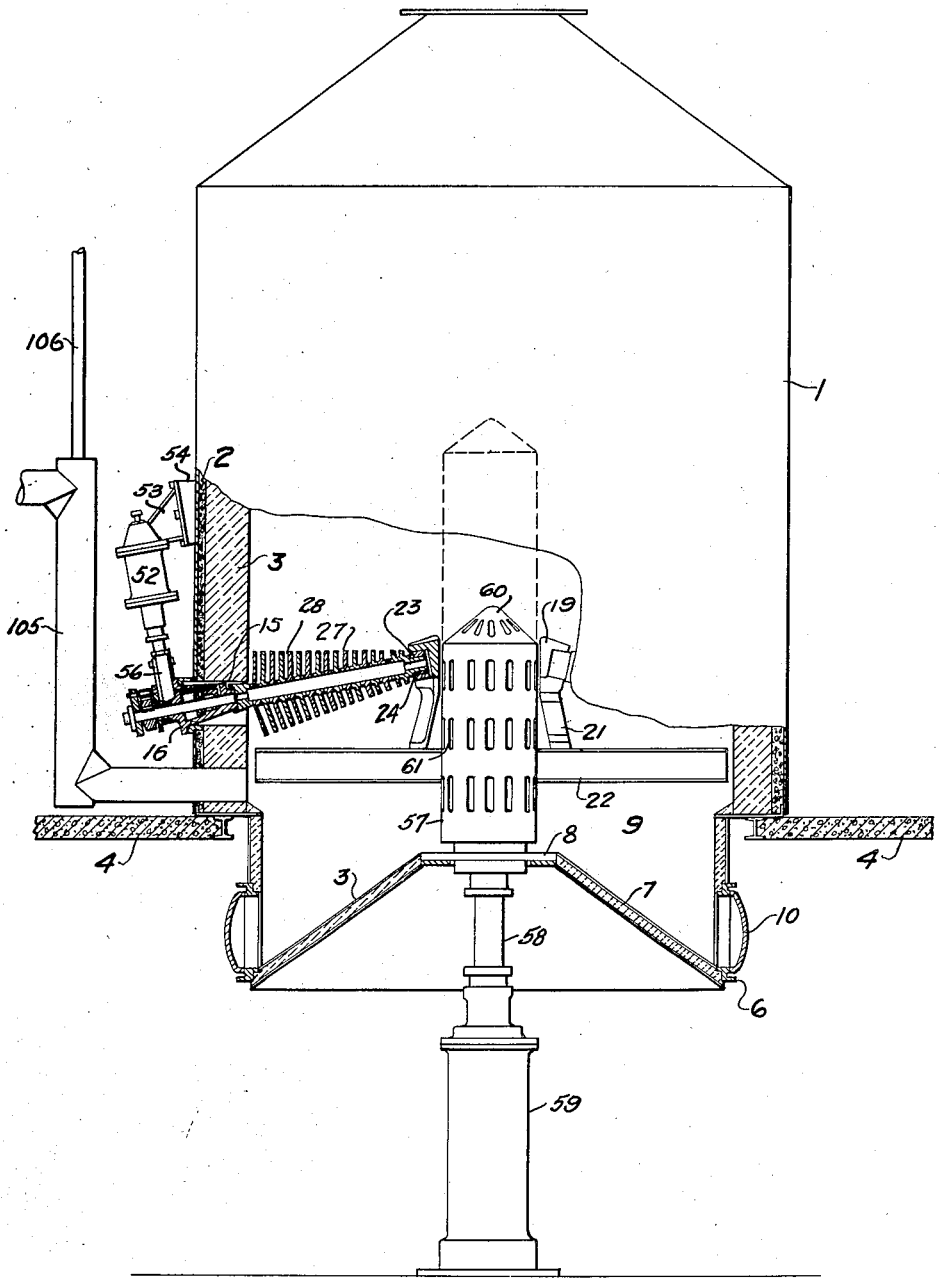

Dec. 11, 1934.　　　　F. W. STEERE　　　　1,984,045

FUEL SUPPORT FOR GAS GENERATORS AND OTHER COMBUSTION APPARATUS

Filed Nov. 15, 1927　　　4 Sheets-Sheet 1

Frank W. Steere
INVENTOR

ATTORNEY

Dec. 11, 1934.  F. W. STEERE  1,984,045
FUEL SUPPORT FOR GAS GENERATORS AND OTHER COMBUSTION APPARATUS
Filed Nov. 15, 1927  4 Sheets-Sheet 2
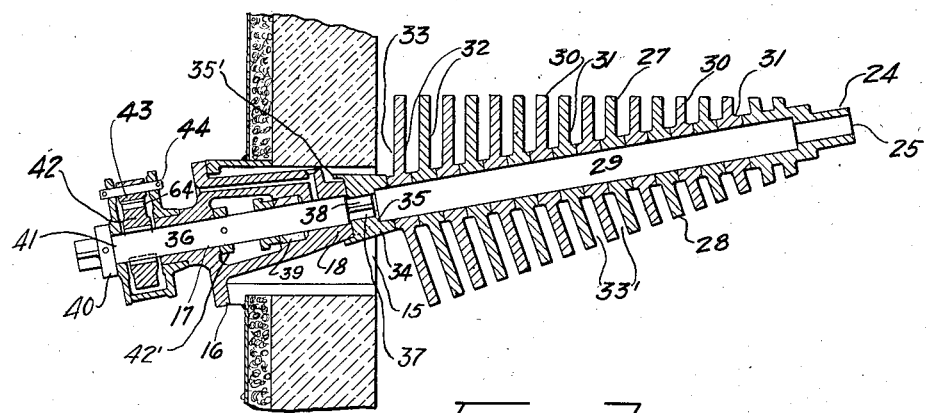
Fig. 2
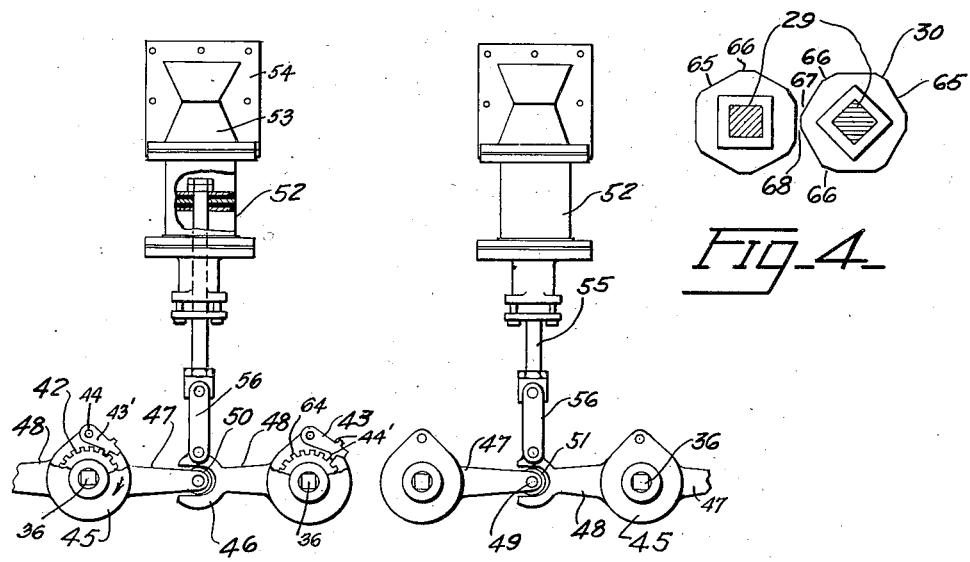
Fig. 3
Fig. 4
Frank W. Steere
INVENTOR
BY
ATTORNEY Dec. 11, 1934.                F. W. STEERE                1,984,045
       FUEL SUPPORT FOR GAS GENERATORS AND OTHER COMBUSTION APPARATUS
                     Filed Nov. 15, 1927        4 Sheets-Sheet 3

Dec. 11, 1934.  F. W. STEERE  1,984,045
FUEL SUPPORT FOR GAS GENERATORS AND OTHER COMBUSTION APPARATUS
Filed Nov. 15, 1927  4 Sheets-Sheet 4

Frank W. Steere
INVENTOR

BY

ATTORNEY

Patented Dec. 11, 1934

1,984,045

UNITED STATES PATENT OFFICE 1,984,045

FUEL SUPPORT FOR GAS GENERATORS AND OTHER COMBUSTION APPARATUS

Frank W. Steere, Scarsdale, N. Y., assignor to Semet-Solvay Engineering Corporation, New York, N. Y., a corporation of New York Application November 15, 1927, Serial No. 233,471

9 Claims. (Cl. 126—181)

This invention relates to an apparatus for supporting a fuel bed and removing clinker and ash therefrom and is particularly adapted for use in the manufacture of water or producer gas. It also relates to a process for manufacturing gas which may be practiced by such apparatus. Although I have shown and described herein as an embodiment of my invention a generator for water gas manufacture, it will be understood that the invention is not limited thereto but may be used in connection with other gas generating devices as for example in producer gas operation.

In the usual operation of water gas machines, it is necessary at more or less regular, frequent intervals to remove ash and clinkers from the fuel bed. In the case of clinkers this is done by manually removing them from the bed using a suitable tool. Immediately after clinkering, the fuel bed is of substantially uniform density but during the subsequent operations clinkers gradually build up in the fuel bed until they are again removed. Due to this gradual formation of clinkers the density of the fuel bed continually varies, thereby varying the conditions of gas manufacture and rendering accurate control of the gas making difficult. Further, this periodic clinkering of the machine in addition to the arduous task involved, necessitates the discontinuance of the gas making operation thus effectively decreasing the gas making capacity of the set.

An object of the present invention is to simplify the operation of gas generating devices by providing continuously operative and automatic means, as distinguished from manual means, for removing ash and clinker from fuel beds thereby maintaining uniform fuel bed conditions throughout the operation and reducing the labor incident to operation. The provision of automatic means for removing ash and clinker eliminates the necessity for periodically discontinuing the gas making operation to remove clinkers thus permitting continuous and automatic operation and thereby increasing the efficiency and capacity of such machines.

According to the present invention there is provided a grate for supporting the fuel bed which comprises members mounted about the longitudinal axis of the cylindrical casing or shell of the generator, preferably radially with respect to the longitudinal axis, these members being automatically operated to remove ash and clinker from the fuel bed thereby maintaining uniform conditions therein throughout the operation of the generator.

In a preferred embodiment of this invention the grate comprises conical shaped sections formed by mounting a plurality of preferably polygonal dish-shaped discs of gradually diminishing surface area at spaced positions on shafts or axles. The conical sections are mounted so that the base portions i. e. the discs of greatest surface area, are positioned around the inner periphery of the shell or casing of the generator and the vertices are positioned around the longitudinal axis of the casing so as to form preferably a substantially circular opening having its center on said longitudinal axis. The longitudinal axes of the conical sections are arranged at an incline so that the plane tangent to the upper surface of these roll sections is a horizontal plane. The sections are operatively connected in groups to hydraulic cylinders or motors and are intermittently successively and uni-directionally rotated, approximately half of the sections turning in a direction opposite to that of the remaining sections of the grate, the sections being so positioned that adjacent sections turn in opposite directions. The hydraulic cylinders are preferably connected to the conical roll sections or members so that upon one stroke of the piston alternate sections are rotated or turned while the remaining sections remain stationary and upon the succeeding stroke the sections which have remained stationary are rotated while the said alternate sections remain stationary, thereby rotating all the sections upon each complete back and forth stroke of the piston rod. Means are also provided for reversing the direction of rotation of the conical roll sections or members so that when desired the direction of rotation of some or all of the rolls may be changed. A vertically reciprocating poker is adapted to be moved through the central circular opening. The action of the poker and conical rolls of the grate is to continuously agitate the fuel bed and automatically and continuously remove the ash and clinker therefrom as will be hereafter more fully explained.

This invention accordingly comprises a device having a grate including a plurality of members for supporting a fuel bed and means for moving said members to remove ash and clinker from the fuel bed.

Figure 5:
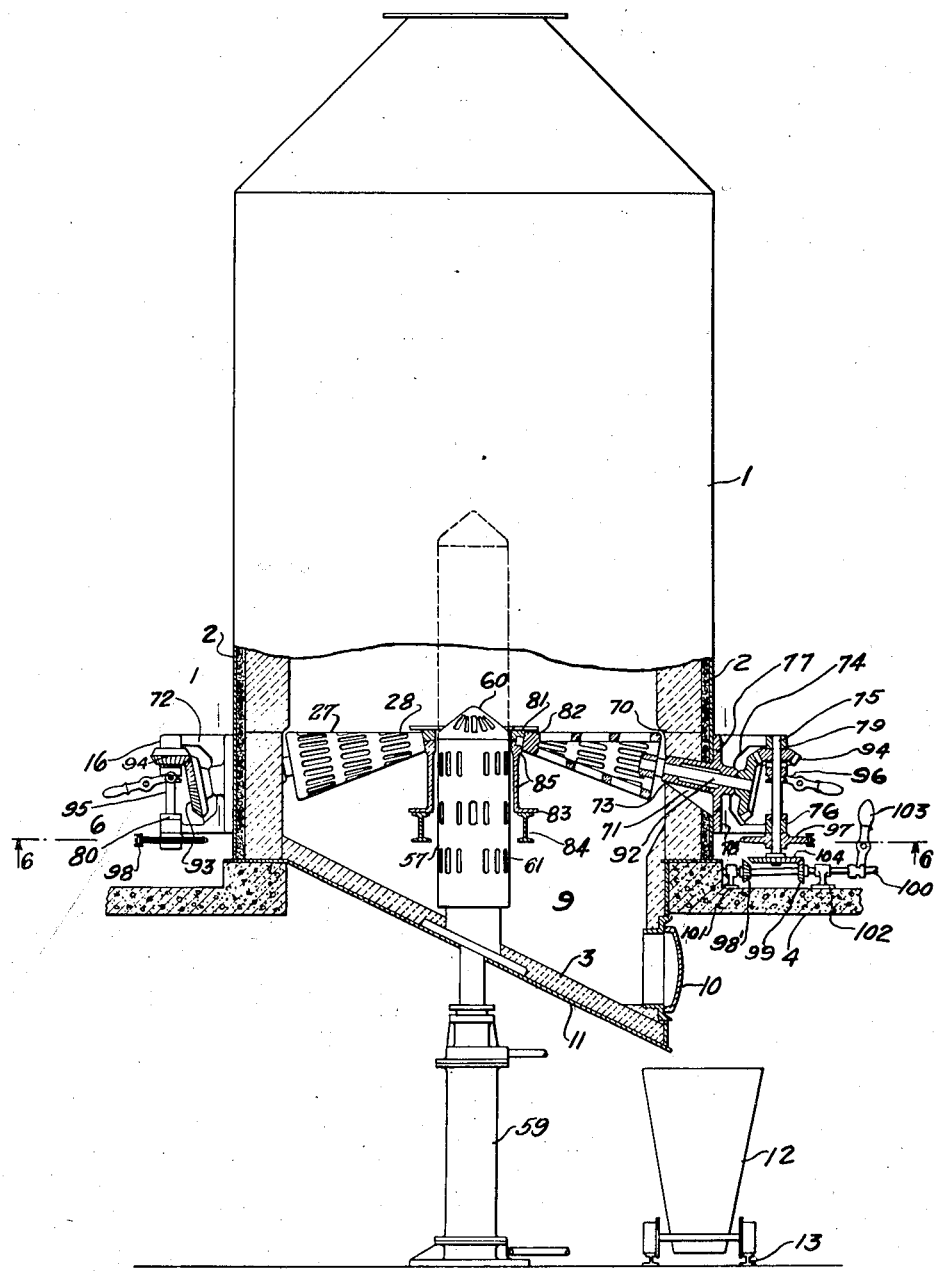
Figure 6:
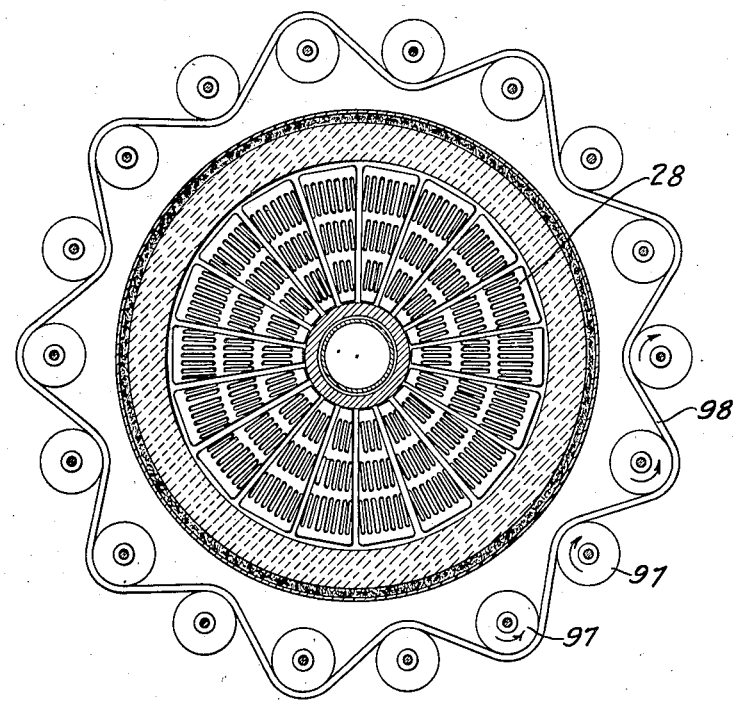
Figure 7:
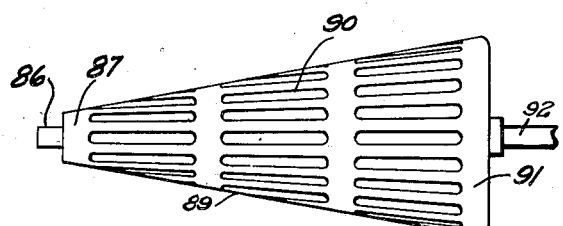

Other objects and advantages will appear from the following detailed description taken in connection with the accompanying drawings in which Fig. 1 shows a preferred embodiment of the invention applied to a gas generator. This figure shows a vertical side elevation of a water gas generator partly in section and partly broken away to show the construction of the grate and the operating mechanism therefor; Fig. 2 is a fragmentary sectional detail partly in elevation showing on an enlarged scale a conical roll section or member of the grate and the mounting therefor illustrated in Fig. 1; Fig. 3 is a fragmentary front elevation partly broken away for the sake of clearness, showing the driving mechanism for the conical roll sections on an enlarged scale; Fig. 4 is a front elevational detail partly in section and showing the relative positions of the discs or plates of adjacent conical roll sections; Fig. 5 is a vertical side elevation of a water gas generator partly in section and partly broken away to show the construction of a modified form of grate and the operating mechanism therefor; Fig. 6 is a sectional plan view of this modification taken on the line 6—6 of Fig. 5 and diagrammatically showing the gear and chain drive for rotating the conical roll sections of the grate, and Fig. 7 is a side elevation of a detail of this modification showing one of the conical roll sections of the grate.

In the preferred embodiment of the invention illustrated on the drawings 1 indicates a cylindrical shell or casing of a water gas generator lined with suitable heat insulating material 2 and provided with a fire brick lining 3. The generator is supported on a cement or other suitable base 4, and preferably extends below the base 4, the lower extremity 6 being connected by truncated conical plate 7 with a ring 8 forming an ash pit 9. The plate 7 is also provided with a fire brick lining 3. Doors 10 are positioned in the ash pit and whenever desired may be opened and the ash pit cleaned. The base of the ash pit may be inclined as for example base 11, Fig. 5, or the base may be in a horizontal plane or the ash pit may be of any suitable shape or configuration, the circular pit having the conical base plate 7, being merely illustrated as a preferred form. As shown in Fig. 5 there is provided a dump car 12 running on tracks 13 arranged to receive the ash removed from the the ash pit 9.

The fire brick lining 3 of the generator is provided with a plurality of openings 15 extending circumferentially at regular spaced positions through the lining 3. Openings 15 extend through the heat insulating lining 2 and the casing 1 and have mounted therein castings 16 which are provided with cylindrical bearing portions 17 and 18. Mounted preferably coaxially with the longitudinal axis of the casing 1 is an open casting 19 bolted or otherwise secured to an inclined casting 21 resting on "I" beams 22 which serve to support casting 21 in fixed position. The casting 19 is positioned on casting 21 to form bearing surfaces 23 at regularly spaced positions around the outer periphery of these castings.

Rotatably mounted in the bearing surfaces 23 are the bearing portions 24 integral with or secured to the vertices 25 of the truncated conical roll sections 27 of the grate indicated generally by the reference numeral 28. Each conical roll section comprises a rectangular or flattened shaft 29 which has slidably mounted thereon preferably at regular spaced positions polygonal plates or discs 30 provided with circular thickened portions 31. These discs are dished as indicated at 32, and are of gradually diminishing surface area, the plate of greatest area being positioned at the end 33 of the shaft 29 adjacent the interior periphery of the shell or casing 1 while the disc with the smallest surface area is positioned adjacent the casting 19. This construction provides a grate section having the general configuration of a conical roll provided with a plurality of annular slots or recesses 33'.

Bearing members 34 having annular collars 35' are rotatably positioned in openings 15 contiguous to the bearing portion 18 of casting 16, so that the collars 35' extend circumferentially about casting 16 providing a substantially dust proof mounting. The rectangular or flattened shafts 29 are mounted in the bearing members 34 as indicated at 35 and are preferably welded thereto. Shafts or rods 36 are rotatably mounted in the bearing portions 17 and 18 of casting 16 and have the ends 37 flattened or rectangular in form and in driving engagement with the rectangular openings 38 in bearing members 34. Suitable packing and glands 39 are positioned on shafts 36 to provide a dust proof bearing support for the ends 37 thereof and collars 42' are keyed or otherwise secured to shafts 36 and positioned adjacent the bearing portions 17 to maintain the described structure in operative relation as will be hereinafter more fully explained. The other ends 41 of shafts 36 are positioned exteriorly of the casing 1 and keyed to or otherwise secured to the ends 41 are rachets 42 which are in driving engagement with double toothed pawls 43 pivotally mounted on pins 44 passing through disc shaped portions 45 of toggle levers 46. The toggle levers 46 comprise the disc shaped portions 45 loosely mounted on shafts 36, lever arms 47 integral with or attached to disc shaped portions 45 and extending therefrom and bifurcated lever arms 48 extending in diametrical alignment with lever arms 47 from the other side of disc portions 45. Pins 49 are secured to the lever arms 47 and have mounted thereon rolls 50 which are positioned in the bifurcations 51 in the lever arms 48. Collars 40 are preferably positioned on the shafts 36 to maintain the toggle levers 46 in operative position on shaft 36.

Hydraulic cylinders or motors 52 are preferably secured to the exterior of the casing 1 by bracket arms 53 bolted or otherwise secured to standards 54. Piston rods 55 of the hydraulic cylinders are directly or indirectly connected by links 56 with the bifurcated arms 48 so that back and forth movement of the piston rods oscillates the toggle levers 46 and thereby intermittently and uni-directionally rotates the conical roll sections as will be hereinafter more fully explained. The shafts 36 having the toggle levers 46 mounted thereon are arranged in groups of any desired number so that one hydraulic cylinder serves to rotate all the shafts of a group. As for example, viewing Fig. 3, the hydraulic cylinder shown to the left of Fig. 3 operates the two shafts 36 shown and also the shafts operatively connected thereto by arms 47 and 48 fragmentarily shown. With this construction three or four hydraulic cylinders suffice to rotate all the shafts 36.

Positioned partly within the ash pit 9 is a vertically reciprocating cylindrical hollow poker member 57 the longitudinal axis of which is in alignment with the longitudinal axis of the casing or shell 1. The poker member 57 s connected to the piston rod 58 of a hydraulic motor or cylinder 59 positioned below the ash pit 9 and is moved by the hydraulic cylinder 59 back and forth from the full line position shown in Figs. 1 and 5 to the dotted line positions. This poker member is preferably positioned so that when in lowered or full line position Fig. 1, the tip 60 of the poker extends through the cylindrical portion of the casting into the fuel bed. Elongated slots 61 are provided in the outer surface and top of the shell of the poker member through which air and steam may be admitted to the fuel bed as more fully described in my copending application Serial No. 630,676, filed April 7, 1923.

Leading to the base of the generator preferably below the grate into the ash pit 9 is the air blast pipe 105 (Fig. 1) for supplying air during the blasting period. A steam pipe or jet 106 leads into the air blast pipe 105 and is used to supply steam for making gas during the up-run. It is understood of course that the showing of steam and air pipes is merely illustrative in character and that the steam and/or air may be supplied in any desired manner to any desired portion of the generator.

In operation the piston rods 55 (Fig. 3) of the hydraulic cylinders 52 are reciprocated at regular intervals by the admission and discharge of a suitable pressure fluid into and through the hydraulic cylinders thereby oscillating through links 56 the bifurcated lever arms 48 which in turn engage rolls 51 and oscillate lever arms 47. The movement of toggle links 46 causes the discs 45 to oscillate and thereby advance the pawls 43 which are in engagement with the teeth 64 of ratchets 42 thereby turning the ratchets 42 and intermittently rotating shafts 36 and the conical roll sections 27 in driving engagement therewith. Due to the curved or cam surfaces 44' on the pawls 43 and 43' the pawls 43 and 43', upon the return stroke of piston rods 55, idly slide over the notched or toothed portion of the ratchet wheels 42 into position to operatively engage the teeth 64 and turn the ratchet wheel upon the succeeding stroke. The pawls 43 of adjacent discs are so positioned with respect to the teeth of the ratchet wheels that upon the down stroke of the piston rod alternate pawls, as for example pawls 43', Fig. 3, engage and rotate the ratchet wheels 42 while the remaining pawls 43 move idly over the ratchets. Upon the succeeding stroke the idle pawls are operative to turn the ratchets while the alternate pawls are idle. As heretofore pointed out the pawls are pivotally mounted on pins 44 so that they can be engaged either manually or by a suitable tool and swung about pins 44 to engage either the right or left side of the ratchet wheel viewing Fig. 3. By positioning the pawls as desired the shafts 36 and the grate segments 27 connected thereto can be revolved clockwise, counter-clockwise, all in one direction or part in one direction and part in another. The above described operation, however, wherein alternate grate sections rotate in opposite directions, substantially half of the grade sections moving on one stroke of the piston rods and the remaining sections on the return stroke is preferred, for not only does this form of operation conserve the power incident to the operation of the hydraulic cylinders by having the piston rods performing actual work on both the up and down strokes but also it provides a uni-directionally intermittent operation of the conical roll sections in crushing relation to effectively crush and grind the clinker and ash and to continuously agitate the fuel bed whereby ash and clinker are removed therefrom.

Adjacent conical roll sections 27 of the grate are mounted (see Fig. 4) so that the disc members 30 thereof are positioned with the flat peripheral edges 65 of the discs of one roll in crushing relation with the edges of the discs of the other roll, i. e. the flat peripheral edges 65 of the polygonal discs of one roll as the roll rotates, come into crushing relation with the angular edges 66 of the discs on the adjacent roll thereby forming space or hopper portions 67 and grinding portions 68.

The poker 57 is automatically reciprocated at regular intervals by the admission and discharge of a suitable pressure fluid into and through the hydraulic cylinder 59 thus keeping the center of the fuel bed open forcing clinkers that may have formed in the fuel bed outward toward the shell or casing and preventing the formation of large clinker masses. The rotating conical roll sections 27 catch and grind any clinkers that may be present in the ash and cause the clinker and ash to travel between the rolls and through slots 33' into the ash pit. The sections of the grate being cone shaped, there is provided a greater grinding surface near the interior periphery of the shell 1 so that large clinkers which may be formed and forced by the action of the poker towards the casing 1 are effectively engaged and crushed thereby. Preferably the direction of rotation of the conical roll sections is reversed at regular intervals to prevent clogging of the rolls. This can readily be accomplished by moving the pawls 43, 43' from driving engagement with one side of ratchet wheels 42 to driving engagement with the teeth on the other side (see Fig. 3).

In the modified form of invention illustrated on Figs. 5 to 7 inclusive the fire-brick lining 3 of the generator is cut away or recessed at 70 and is also provided with a plurality of openings 71 extending circumferentially at regular spaced positions through the lining 3. Openings 71 extend through the heat insulating lining 2 and the casing 1 and have mounted therein castings 72 which are provided with cylindrical bearing portions 73 and 74 and with upper and lower flange portions 75 and 76 positioned exteriorly of the shell or casing 1. The castings 72 have collar portions 77 and 78 which are adapted to rest snugly against the outer periphery of the casing as shown in Fig. 5. The upper and lower flanges 75 and 76 are provided with bearing portions 79 and 80 the function of which will be hereinafter explained.

Mounted in alignment with the upper edge of the recessed or cut away portion of the fire-brick lining is a cylindrical casting 81 having flanges 82 and 83, the latter resting on "I" beams 84 which serve to support the cylindrical casting in fixed position. The casting 81 has bearing surfaces 85 positioned at regularly spaced points around the outer periphery. Rotatably mounted in the bearing surfaces 85 are the bearing portions 86 integral with or secured to the vertices 87 of truncated hollow conical rolls 89 having elongated slots 90 in the outer circumferential surface thereof through which air travels to the fuel bed and through which ashes from the bed may also fall. The base portions 91 of the conical rolls are provided with axles or rods 92 extending from the center thereof through the bearings 73 and 74 in the casting 72. Bevel gears 93 are keyed or otherwise secured to the axles 92.

Bevel gears 94 loosely mounted on shafts 95 rotatably journaled in bearings 79 and 80 in the upper and lower flanges 75 and 76 of castings 72 are adapted to be moved into driving relation with respect to bevel gears 93 by means of a suitable clutch 96 keyed or otherwise secured to shafts 95. Gears 97 are keyed to the lower portions of shafts 95 and are connected by a drive chain 98 which passes in zig-zag relation over the gears 97 so that adjacent gears and the conical rolls in driving engagement therewith are continuously rotated in opposite direction. One of the shafts 95 has keyed thereon a bevel gear 104 adapted to mesh with either of the bevel gears 98' and 99 keyed to shaft 100 which is in turn directly or indirectly connected to a suitable source of power such as an electric motor. The shaft 100 is slidably mounted in bearing supports 101 and 102 and is operatively connected with a clutch lever arm 103, conventionally shown, so that operation of lever arm 103 throws either bevel gear 98 or 99 into driving engagement with gear 104 on shaft 95 and rotates this shaft in the desired direction.

In operation, the shaft 100 being driven from a suitable source of power and the clutch 103 having been moved so that the bevel gear 104 is in driving engagement with gear 99 on shaft 100 and the clutch 96 being positioned so that bevel gears 93 and 94 are in mesh, the conical rolls 27 are rotated through the meshing bevel gears 93 and 94, each pair of rolls turning towards each other, i. e., in opposite directions, as indicated by the arrows (Fig. 6). The poker 57 is automatically reciprocated at regular intervals by the admission and discharge of a suitable pressure fluid into and through the hydraulic cylinder 59 thus keeping the center of the fuel bed open forcing clinkers that may have formed in the fuel bed outward toward the shell or casing and preventing the formation of large clinker masses. As in my preferred embodiment the rotating conical rolls 27 catch and grind any clinkers that may be present in the ash and cause the clinkers and ash to travel between the rolls and through the elongated slots 90 into the ash pit. The sections of the grate being cone shaped, there is provided a greater grinding surface near the interior periphery of the shell so that large clinkers which may be formed and forced by the action of the poker towards the casing 1 are effectively engaged and crushed thereby. Preferably the direction of rotation of the conical rolls is reversed at regular intervals to prevent clogging of the rolls. This may be accomplished by throwing the clutch lever 103 to disengage the bevel gears, as for example 99, 104 from driving engagement and cause the other of gears 98, 99, to wit, gear 98, in the instant case, to mesh with gear 104.

It will be noted that the conical roll sections comprising the grate for supporting the fuel bed revolved during the operation of the generator, i. e., during the blasting periods and also during the gas making runs which may be up or down runs as in the usual water gas machines or may be up, down and back runs employed in any desired order, thereby presenting a fresh and relatively cool portion of the grate to the fuel bed. The air or oxygen containing gases for the blasting operation are preferably admitted directly to the ash pit below the grate, as for example through blast pipe 105 and pass through the slots in the conical roll sections and between the rolls up into the fuel bed passing in heat interchange relation with the grate sections thereby cooling them. Inasmuch as the portion of the grate contacting with the fuel bed changes regularly, the entire grate is effectively cooled. Similarly, steam or other gas for an up run operation is preferably passed directly to the ash pit 9 by steam pipe or jet 106 and thence through the grate into the fuel bed whereby the steam acts as a cooling medium for the grate sections. This effective cooling of the grate, materially prolongs the life and utility thereof.

Also the conical roll grate sections illustrated in Figs. 1 and 2 can readily be removed, replaced or repaired so that whenever a portion of a roll section is impaired, that section can readily be removed, the impaired portion repaired, the section replaced and the grate again operated. For example, if certain discs are broken on one of the roll sections 27, that section is simply removed by lifting casting 19, loosening collar 42' and moving the shaft 36 toward the left (see Fig. 2) until the squared portion 37 is removed from bearing 34 and then tilting the section until bearing 34 is removed from opening 15 whereupon the section can be removed, and the discs slid off the shaft, new discs replace the broken discs and the section again inserted in operative position.

It will be further noted that the axial dimensions of the grate sections are comparatively small, particularly as compared with the usual grate made up of longitudinal parallel bars extending across the fuel bed. It has been found in practice that due to the intense heat of the fuel bed and the weight thereof the usual longitudinal grate bars tend to sag and soon become inefficient and undesirable. In my invention the grate sections are arranged radially with respect to the longitudinal axis of the casing so that the length thereof is comparatively short and can be designed and arranged to efficiently support the fuel bed at all times without danger of the sections of the grate sagging due to intense heat and/or the weight of the fuel bed.

It will also be noted that the longitudinal axes of the conical roll sections are inclined with respect to a horizontal plane so as to form a horizontal plane support for the fuel bed as indicated by the upper surface of the conical rolls adapted to support the fuel bed (see Fig. 1). The conical rolls converge from the inner periphery of the casing towards the longitudinal axis thereof and are arranged to define preferably a circular opening having its center on the longitudinal axis of the casing. The poker member preferably has its longitudinal axis in alignment with the longitudinal axis of the casing and is adapted to be moved through this circular opening, its dimensions being such that there is but a small clearance between the surface of the poker member and the opening defined by the vertices of the conical rolls so that the poker member and conical rolls of the grate effectively support the fuel bed. While I have shown the poker member as of cylindrical contour and the opening defined by the vertices of the conical roll section as circular it will be understood that this construction and design of poker member and mounting for the conical roll sections is merely a preferred embodiment and that the opening defined by the vertices of the conical roll sections and the cross sectional contour of the poker member may be of any desired configuration.

It will also be noted that the fuel bed is agitated by movement of the conical roll sections constituting the support therefor, thus removing ash and clinker and thereby maintaining a fuel bed of relatively uniform density.

Further, this invention provides efficient means for automatically and continuously removing ash and clinker, thereby eliminating the necessity for discontinuing the gas making operation to remove clinker from the fuel bed and enabling a continuous operation with consequent increase in the capacity of the set. The removal of clinkers and ash and gentle agitation of the fuel provides a fuel bed of relatively uniform density, thereby maintaining more uniform fuel bed conditions throughout the operation of the generator and increasing the thermal efficiency of the gas-making apparatus.

My invention disclosed herein may be used in combination with an air or gas cooled lining for the generator, thereby reducing the development of clinker on the generator wall and within the fuel bed, and substantially eliminating clinker and ash from the fuel bed. This combination is more fully disclosed and claimed in my copending application Serial No. 271,465, filed April 20, 1928. Also the grate of my invention comprising the movable roll sections may be combined, in a gas generator, with a pier or other fixed member extending from said grate up into the fuel bed as more particularly described and claimed in my copending application Serial No. 271,466, filed April 20, 1928.

It will of course be understood that while specific embodiments of the invention have been shown and described, various changes in the details of the embodiments may be made, by those skilled in the art and the invention is not to be limited to the structure described but only by the scope of the appended claims.

What is claimed is:

1. In a combustible gas generator, a grate within the generator adapted to support a fuel bed and comprising a plurality of members positioned radially with respect to the walls of said generator to provide an opening in the grate, a poker member arranged to be moved up through said opening, into the zone of the fuel bed above the gas-making zone and retracted from said zone through said opening, and means for moving said poker member and said grate members.

2. In a device of the character described, a casing, a grate for supporting a fuel bed within said casing, said grate comprising members positioned around the inner periphery of said casing, converging towards the longitudinal axis thereof and arranged to provide an opening through which said longitudinal axis passes and a reciprocable poker member adapted to be moved through said opening into the fuel bed and retracted therefrom through said opening.

3. In a gas generating device, a cylindrical casing having a fuel bed therein, a grate comprising conical members positioned around the inner periphery of said casing converging towards the longitudinal axis thereof, arranged to provide a substantially horizontal surface for supporting said fuel bed and to provide a circular opening having its center on said longitudinal axis, a reciprocable cylindrical poker member, means for reciprocating said poker member through said central opening into the fuel bed and retracted therefrom through said opening and means for moving the grate members to remove ash and clinkers from said fuel bed.

4. In a gas generating device, a casing, a grate for supporting a fuel bed within said casing, said grate comprising truncated conical roll sections having their longitudinal axes positioned at an incline with respect to the plane of the base portion of said fuel bed and having the bases of said conical roll sections positioned around the inner periphery of said casing and the vertices positioned about the longitudinal axis of said casing to provide an opening, a poker member arranged to be moved through said opening, means for rotating adjacent conical rolls in opposite directions and means for reversing the direction of rotation of said conical rolls.

5. In a water gas generating device, a casing, a grate for supporting a fuel bed within said casing, said grate comprising truncated conical roll sections having the longitudinal axes thereof positioned at an incline with respect to the horizontal to form a horizontal support for said fuel bed and having the base of said conical rolls positioned around the inner periphery of said casing and the vertices positioned about the longitudinal axis of said casing arranged to provide a circular opening having its center on said longitudinal axis, a reciprocal cylindrical poker member arranged to move through said circular opening, means for rotating said conical rolls, and a hydraulic cylinder for moving said poker member.

6. In a water gas generator having a cylindrical casing, bearing members in said casing, an open bearing member having the longitudinal axis thereof in alignment with the longitudinal axis of said casing, a grate comprising truncated conical roll sections said sections having a shaft and polygonal shaped dished discs mounted thereon at regularly spaced positions to form slots in said roll sections, the vertices of said conical roll sections being provided with bearing portions rotatably mounted in the outer surface of said open cylindrical bearing member and said shafts being rotatably positioned and extending through said bearing members in said casing, the longitudinal axis of said conical rolls and said shafts being positioned at an incline with respect to the horizontal to form a horizontal support for said fuel bed, toggle links connecting said shafts exterior of said casing, ratchet wheels on said shafts, pawls pivotally mounted on said links, and hydraulic cylinders for oscillating said links to intermittently rotate said roll sections in the desired directions.

7. In a gas generator, a grate for supporting a fuel bed comprising a plurality of members in closely spaced relation and arranged to provide an opening, a poker member adapted to be moved through said opening into the fuel bed and withdrawn from the fuel bed through said opening, means for moving said poker member, means for rotating alternate grate members in one direction while the other members remain stationary, and means for rotating said other members in the opposite direction from the direction of rotation of said alternate members while said alternate members remain stationary.

8. In a gas generator, a grate for supporting a fuel bed, said grate comprising members positioned around the inner periphery of said generator converging towards the central vertical axis thereof, and arranged to provide an opening coaxial with said axis, a poker member adapted to be moved through said opening into the fuel bed and retracted therefrom through said opening, means for moving said poker member, and means for rotating said grate members.

9. In a water gas generator, a grate for supporting a fuel bed, said grate comprising truncated conical roll sections disposed to provide an opening, a reciprocal poker member arranged to move through said opening into the fuel bed, means for rotating said conical rolls, and means for moving said poker through said opening into the fuel bed and withdrawing it from said fuel bed through said opening.

FRANK W. STEERE.